(12) United States Patent
Kim et al.

(10) Patent No.: US 7,864,809 B2
(45) Date of Patent: Jan. 4, 2011

(54) METHOD OF TRANSMITTING AND RECEIVING DATA IN NETWORK ENVIRONMENT WITH WIRED AND WIRELESS NETWORKS BRIDGED USING RELAY PORTAL

(75) Inventors: Min-soo Kim, Seoul (KR); Song-yean Cho, Seoul (KR); Ji-young Kong, Seoul (KR); Hyeong-seok Kim, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 875 days.

(21) Appl. No.: 11/435,901

(22) Filed: May 18, 2006

(65) Prior Publication Data

US 2006/0265480 A1 Nov. 23, 2006

Related U.S. Application Data

(60) Provisional application No. 60/682,022, filed on May 18, 2005.

(30) Foreign Application Priority Data

Aug. 12, 2005 (KR) ....................... 10-2005-0074413

(51) Int. Cl.
  *H04J 1/10* (2006.01)
  *H04J 3/08* (2006.01)
  *H04B 7/185* (2006.01)
  *H04J 1/02* (2006.01)
  *H04J 3/16* (2006.01)
(52) U.S. Cl. ....................... 370/492; 370/497; 370/471; 370/501; 455/13.1
(58) Field of Classification Search ................. 370/351, 370/386, 492, 497, 471, 501, 475, 328; 455/13.1, 455/15
See application file for complete search history.

(56) References Cited

U.S. PATENT DOCUMENTS

| 5,724,346 | A | 3/1998 | Kobayashi et al. |
| 6,138,019 | A | 10/2000 | Trompower et al. |
| 6,345,043 | B1 | 2/2002 | Hsu |
| 6,862,448 | B1 | 3/2005 | Bims |
| 7,313,399 | B2 * | 12/2007 | Rhee et al. ................. 455/445 |
| 7,522,540 | B1 * | 4/2009 | Maufer ....................... 370/254 |

(Continued)

FOREIGN PATENT DOCUMENTS

EP      0647077 A2   4/1995

(Continued)

OTHER PUBLICATIONS

ISO/IEC 8802-11:1999 IEEE Std. 802.11: Part 11: Wireless LAN Medium Access Control (MAC) and Physical Layer (PHY) specifications, pp. 1-240 (XP002395305).

(Continued)

*Primary Examiner*—Un C Cho
*Assistant Examiner*—George Eng
(74) *Attorney, Agent, or Firm*—Sughrue Mion, PLLC

(57) ABSTRACT

A method of transmitting and receiving data in a network environment with a wired network and a wireless network bridged using a relay portal is provided. The method includes choosing one of a plurality of portals sharing a wired network and a wireless network as a relay portal, and transmitting a data packet to the wired network by setting an identifier of the relay portal as a prioritized receiver of the data packet.

13 Claims, 5 Drawing Sheets

U.S. PATENT DOCUMENTS

| | | |
|---|---|---|
| 2001/0024953 A1 | 9/2001 | Balogh |
| 2003/0207698 A1 | 11/2003 | Shpak |
| 2003/0207699 A1 | 11/2003 | Shpak |
| 2004/0248610 A1 | 12/2004 | Chan |

FOREIGN PATENT DOCUMENTS

| | | |
|---|---|---|
| EP | 1011241 A | 6/2000 |
| EP | 1513290 A1 | 3/2005 |
| JP | 2001-203715 A | 7/2001 |
| KR | 10-2005-0044571 A | 5/2005 |
| WO | 0154353 A1 | 7/2001 |
| WO | 03/045010 A2 | 5/2003 |
| WO | 2005/032062 A1 | 4/2005 |

OTHER PUBLICATIONS

Peyrard, Fabrice., et al., "Mobile Stations Localization in a WLAN," Local Computer Networks, IEEE Conference on Nov. 8-10, 2000, Piscataway, NJ, pp. 136-142.

Communication from the Japanese Patent Office issued Oct. 12, 2010, in counterpart Japanese Application No. 2006-136504.

* cited by examiner

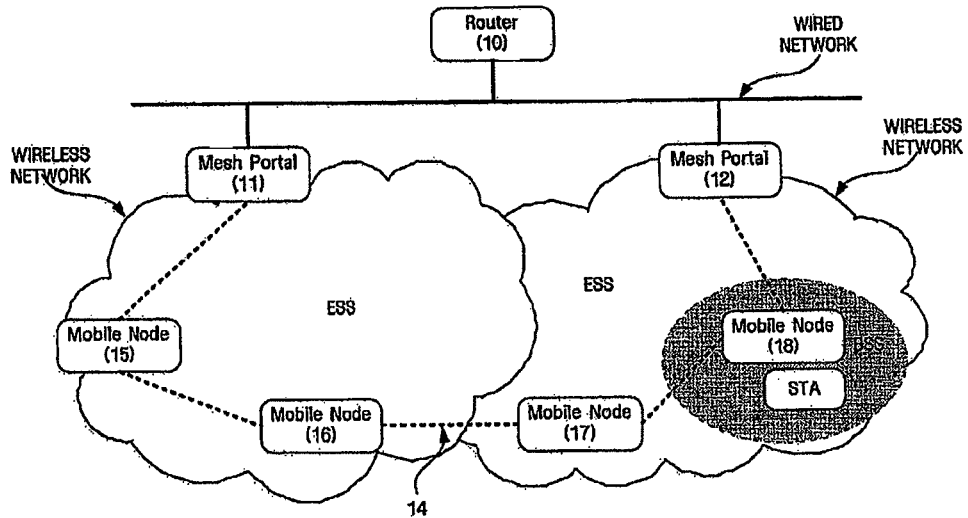
FIG. 1 PRIOR ART
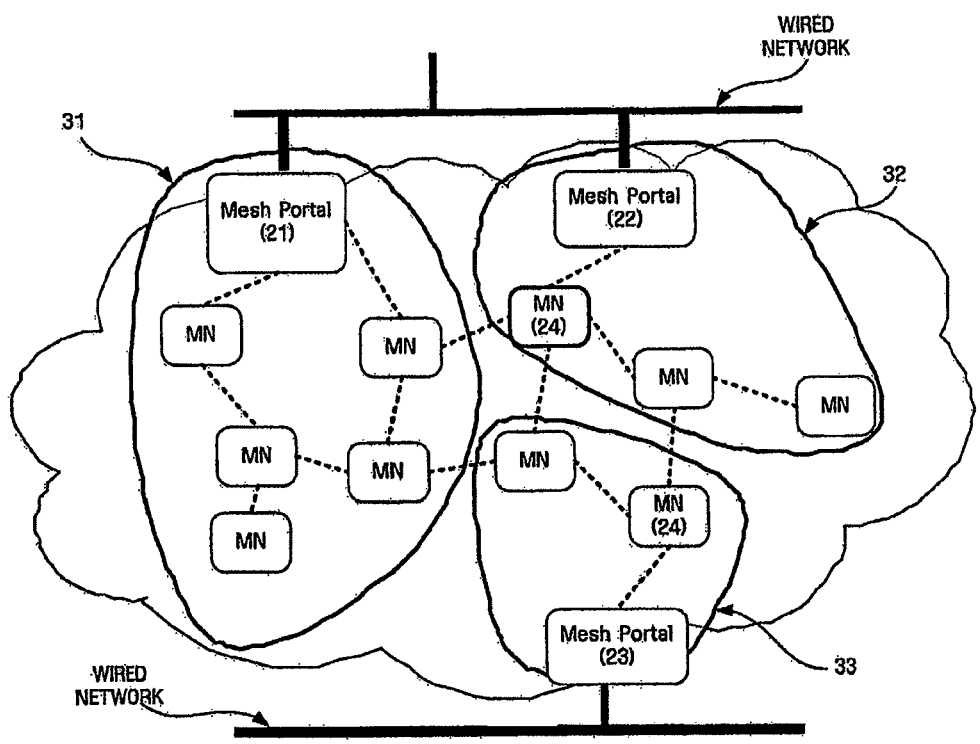
RELATED ART FIG. 2

METHOD OF TRANSMITTING AND RECEIVING DATA IN NETWORK ENVIRONMENT WITH WIRED AND WIRELESS NETWORKS BRIDGED USING RELAY PORTAL

CROSS-REFERENCE TO RELATED APPLICATIONS

This application claims priority from Korean Patent Application No. 10-2005-0074413 filed on Aug. 12, 2005 in the Korean Intellectual Property Office, and U.S. Provisional Patent Application No. 60/682,022 filed on May 18, 2005 in the United States Patent and Trademark Office, the disclosures of which are incorporated herein by reference in their entirety.

BACKGROUND OF THE INVENTION

1. Field of the Invention

The present invention relates to the transmission and reception of data, and more particularly, to a method of transmitting and receiving data in an environment where a wired network and a wireless network are connected to each other using a relay portal.

2. Description of the Related Art

Recently, there is an increasing demand for ultra high-speed communication networks due to widespread public use of the Internet and a rapid increase in the amount of available multimedia data. Since local area networks (LANs) emerged in the late 1980s, the data transmission rate over the Internet has drastically increased from about 1 Mbps to about 100 Mbps. Thus, high-speed Ethernet transmission has gained popularity and wide spread use. Currently, intensive research into a gigabit speed Ethernet is underway. An increasing interest in the wireless network connection and communication has triggered research into and development of wireless LANs (WLANs), greatly increasing availability of WLANs to consumers. Although use of WLANs may reduce performance in view of lower transmission rates and poorer stability as compared to wired LANs, WLANs have various advantages, including wireless networking capability, greater mobility and so on. Accordingly, WLAN markets have been gradually growing.

With the ever-growing demand for increasing the amount of data transmitted over networks and with recent developments in wireless transmission technology, the IEEE 802.11a, 802.11b, 802.11g, 802.11n, and 802.11s standards have been suggested. These standards are improved versions of the IEEE 802.11 standard, which is an initial WLAN standard defining WLANs offering a transmission speed of 1-2 Mbps. Standardization among the IEEE 802.11a, 802.11b, 802.11g, 802.11n, and 802.11s standards has already been completed or is underway.

However, there still exists a physical and economical limit in establishing a network environment based solely on wireless networks. Therefore, various methods have been suggested for establishing a network environment by coupling wireless networks and wired networks, thereby expanding the entire network environment and reducing the development costs.

FIG. 1 is a diagram illustrating a conventional network topology configured by wireless mesh networks. Referring to FIG. 1, mesh portals 11 and 12 are relay devices which connect a wired network and a wireless network and both have a wireless interface and a wired interface. Mobile nodes (MNs) 15, 16, 17, and 18 only have a wireless interface for accessing a wireless network. A mobile node can be connected to a mesh portal via a wireless network and can be connected to a wired network via the mesh portal. Mesh portals and MNs may serve as access points (APs), in which case, they may directly connect MNs to each other via a wireless network. Referring to FIG. 1, the MN 18 serves as an AP and thus configures its own basic service set (BSS).

Conventionally, in order to prevent a loop 14 from being generated in the network topology illustrated in FIG. 1, the mesh portals 11 and 12 have their own unique identifiers and broadcast them to a predetermined wireless network. Then, MNs existing in the predetermined wireless network receive the unique identifiers of the mesh portals 11 and 12 and choose one of the mesh portals 11 and 12. Thereafter, the MNs transmit and receive only broadcast packets transmitted by other MNs which choose the same mesh portal as the one chosen by the MN doing the transmitting and receiving. Another way of preventing generation of a loop 14 is to transmit broadcast packets via only a single portal. In the case of forwarding unicast packets, MNs transmit the unicast packets to a wired network via its chosen portal. Then, the chosen portal forwards only packets transmitted by MNs which exist in a wireless network and choose the same.

FIG. 2 is a diagram illustrating a conventional network topology in which two separate wired networks are connected to a single wireless network.

In a network topology illustrated in FIG. 2, a wireless network is divided into 3 groups 31, 32, and 33 which are managed by mesh portals 21, 22, and 23, respectively. The wireless network operates normally when only one wired segment exists. However, when separate wired segments exist, the wireless network may not operate properly because, while choosing a mesh portal, MNs may block transmission of broadcast packets by MNs belonging to another mesh portal or because MNs transmit unicast packets via only one mesh portal. For example, an MN 24 that chooses the mesh portal 23 which is connected to a lower wired network cannot transmit unicast packets to an upper wired network even though it can still transmit data to the mesh portals 21 and 22 in a wireless manner.

Therefore, if a mesh portal is chosen as a connection to a wired network in order to prevent a loop, it may be difficult to transmit data to another wired network. However, if no mesh portal is chosen as a connection to a wired network, a loop is likely to be generated. Therefore, it is necessary to develop methods and apparatuses for transmitting data to a wired network while preventing a loop from being generated.

SUMMARY OF EXEMPLARY EMBODIMENTS OF THE INVENTION

Exemplary embodiments of the present invention provide a method of setting a relay portal, which can prevent a loop from being generated during packet transmission.

Exemplary embodiments of the present invention also provide a method of transmitting and receiving data in a wireless environment with a wired network and a wireless network bridged using the relay portal.

These and other aspects of the present invention will be described in or be apparent from the following description of the exemplary embodiments.

According to an aspect of the present invention, there is provided a method of transmitting and receiving data in a network environment with a wired network and a wireless network bridged using a relay portal, the method comprising choosing one of a plurality of portals sharing a wired network and a wireless network as a relay portal, and transmitting a data packet to the wired network by setting an identifier of the relay portal as a prioritized receiver of the data packet.

According to another aspect of the present invention, there is provided a method of transmitting and receiving data in a network environment with a wired network and a wireless network bridged using a relay portal, the method comprising receiving a first packet for designating a relay portal, generating an update packet having the address of a predetermined device which transmits the first packet as a source address, transmitting the update packet using a broadcast method, and receiving a second packet from the predetermined device and transmitting the second packet to the wired network if a destination device which is to receive the second packet does not exist in the wireless network.

According to another aspect of the present invention, there is provided a method of transmitting and receiving data of a wireless device connected to a wireless network, the method comprising receiving a data packet which indicates the existence of a wireless network, analyzing the received data packet and connecting to the wireless network, and registering identifying information of the wireless device to a main portal which has connected to the wireless network and a wired network.

According to still another aspect of the present invention, there is provided a frame including an identifier of a receiving device which is to receive data, an identifier of a sending device which transmits the data, and an identifier of one of a plurality of portals in a wireless network to which the sending device is connected.

BRIEF DESCRIPTION OF THE DRAWINGS

The above and other aspects of exemplary embodiments of the present invention will become more apparent by describing in detail exemplary embodiments thereof with reference to the attached drawings in which:

FIG. 1 is a diagram illustrating a conventional network topology in which a wireless network and a wired network are connected to each other;

FIG. 2 is a diagram illustrating a conventional network topology in which two separate wired networks are connected to a single wireless network;

DETAILED DESCRIPTION OF EXEMPLARY EMBODIMENTS OF THE INVENTION

Figure 3:
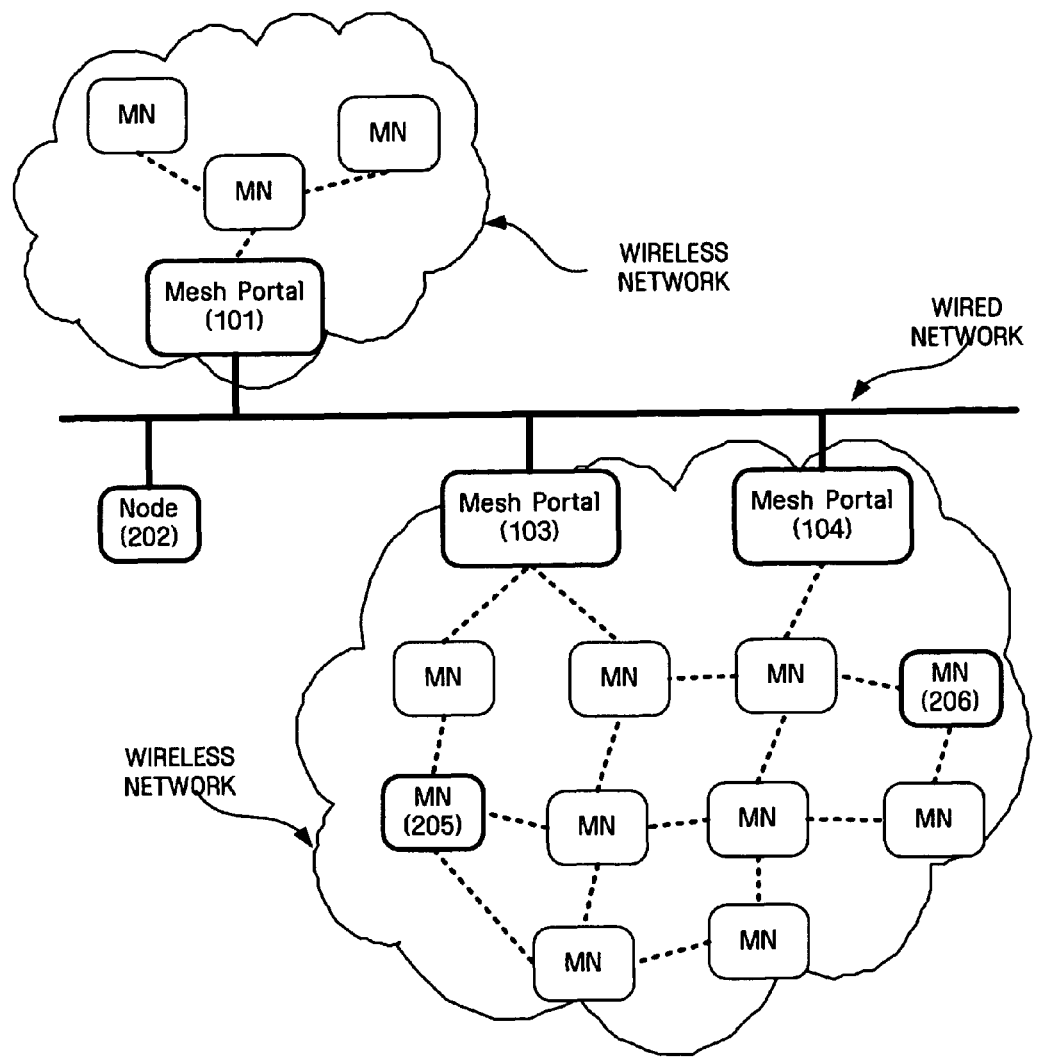
FIG. 3 is a diagram illustrating a network topology in which a wired network is connected to 2 wireless networks, according to an exemplary embodiment of the present invention.

Aspects of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

The present invention is described hereinafter with reference to flowchart illustrations of methods according to exemplary embodiments of the invention. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks.

These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

And each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The terms frequently used in this disclosure will now be defined.

—Portal

A portal is a device connecting a wired network and a wireless network and generally has two or more ports. In order to control such ports, a portal has a bridge function. A portal can be connected to another portal in a wired or wireless manner. When portals are connected in a wired manner, they are physically connected by wired cables. The length of a wire connection between two portals may be extended by bridges. When portals are connected in a wireless manner, they are connected via a wireless link. When portals are connected via a wireless link, they are not necessarily connected directly to each other. In other words, portals can be indirectly connected via a wireless link through other portals. Referring to FIG. 3, reference numerals 101, 103, and 104 represent portals. The portals 103 and 104 are connected by wires.

—Main Portal

One of a plurality of portals connected to one another in both a wired manner and a wireless manner is chosen as a main portal. For example, of the plurality of portals, the portal having the highest media access control (MAC) address may be chosen as a main portal.

Alternatively, of the plurality of portals, the portal which has been connected to a wired network the longest may be chosen as a main portal.

Referring to FIG. 3, of the portals 101, 103, and 104, the portals 103 and 104 are connected to each other in both a wired manner and a wireless manner. Thus, one of the portals 103 and 104 is chosen as a main portal. Since no portal is connected to the portal 101 in both a wired manner and a wireless manner, the portal 101 becomes a main portal.

Portals may notify MNs in a wireless network of their existence by transmitting an advertisement frame throughout the entire wireless network. An advertisement frame transmitted by a portal may include the MAC address of the portal (or a unique identifier of the portal) and other necessary information such as information regarding a wired network to which the portal is connected.

An MN receives an advertisement frame and the MN registers its information with a main portal. The MN information registered with the main portal includes the MAC address of the MN. If the MN is an AP, it may also register the MAC addresses of stations belonging to a BSS of the MN with the main portal. This registration process enables the main portal to identify MNs included in a wireless network.

—Relay Portal

An MN chooses one of a plurality of portals as a relay portal and uses the chosen portal to transmit packets to a wired network. From the viewpoint of an MN, a main portal does not need to be the same as a relay portal. If an MN can designate one of a plurality of portals as a relay portal using an address field of a packet (e.g., a unicast packet, a multicast packet, or a broadcast packet) when transmitting the packet to a wired network, the portal designated as a relay portal may recognize that it has been chosen as a relay portal by the MN. Otherwise, the MN needs to notify the portal designated as a relay portal that it has been chosen as a relay portal.

When a portal recognizes for the first time that it has been chosen by an MN as a relay portal, the portal allows data received via a wired network to which the portal is connected to be transmitted to the MN only through the portal. For this, the portal chosen as a relay portal may transmit to the MN a MAC frame (i.e., an IEEE 802.11f Layer 2 update frame) whose source address is the address of the MN and whose destination address is a broadcast address, thereby obtaining the effect of updating a filtering database of a bridge of portals other than the portal chosen as a relay portal. Therefore, when a packet which is destined for the MN is transmitted from a wired network, the transmission of the packet to the MN by portals other than the portal chosen as a relay portal is not allowed by bridges, i.e., only the portal chosen as a relay portal can forward the packet to the MN. If the packet is transmitted from the wired network before one of a plurality of portals is chosen as a relay portal, a main portal receives the packet and transmits it to a wireless network.

The functions of a main portal and a relay portal will now be described in detail with reference to FIG. 3. First, unicast transmission will now be described.

Referring to FIG. 3, the mesh portals 101 and 104 are main portals.

The transmission of a packet between MNs within a wireless network will first be described in detail with reference to the network environment illustrated in FIG. 3. An MN 205 can directly transmit a packet to an MN 206 via a wireless network because the MN 205 and the MN 206 can reach each other via a wireless link.

The transmission of a packet from a wireless network to a wired network will now be described in detail with reference to the network environment illustrated in FIG. 3. An MN in a wireless network chooses one of a plurality of mesh portals in the wireless network as a relay portal to transmit a packet to a predetermined MN outside the wireless network. Thereafter, the MN in the wireless network transmits a packet to the relay portal. Then, the relay portal transmits the packet to the predetermined MN via the wired network. It is assumed that the MN 205 chooses a mesh portal 103 as a relay portal to transmit a packet. In this case, the MN 205 transmits the packet first to the mesh portal 103. Then, the mesh portal 103 transmits the packet to a destination MN, i.e., a node 202, via a wired network.

According to the 802.11 address system, it is impossible to designate a certain mesh portal so that packets can be transmitted first to the certain mesh portal. According to the current embodiment of the present invention, it is possible to designate a certain mesh portal so that packets can be transmitted first to this specific mesh portal, by using an additional address field (Address 5). Address 5 can be used for designating a mesh portal so that unicast packets can be transmitted first to the mesh portal and for designating a mesh portal so that the mesh portal can forward broadcast packets transmitted by an MN from a wireless network to a wired network.

The transmission of a packet from a wired network to a wireless network will now be described in detail with reference to the network environment illustrated in FIG. 3. If a packet transmitted from a wired network is destined for an MN in a wireless network, the packet is transmitted to the MN in the wireless network via a relay portal chosen by the MN in the wireless network. The transmission of a packet from the node 202 to the MN 205 will now be described in detail with reference to the network environment illustrated in FIG. 3. Referring to FIG. 3, a packet transmitted by the node 202 is transmitted to the mesh portals 103 and 104 via a wired network. Then, the mesh portal 103 which is a relay portal of the MN 205 forwards the packet to the MN 205. If the node 202 transmits the packet via the wired network before the MN 205 chooses one of the mesh portals 103 and 104 as its relay portal, the mesh portal 103, as the main portal, forwards the packet to the MN 205.

The transmission of a broadcast packet in the network environment illustrated in FIG. 3 will now be described in detail. When a broadcast occurs within a wireless network, a broadcast packet is transmitted throughout the entire wireless network. Of the plurality of portals in the wireless network, the portal chosen as a relay portal of an MN which has transmitted the broadcast packet can forward the broadcast packet to the wired network.

When a broadcast occurs in a wired network, only a main portal in the wired network can transmit a broadcast packet to the wireless network. Then, the broadcast packet is broadcast throughout the entire wireless network. Referring to FIG. 3, when a broadcast packet transmitted by the MN 205 in a wireless network is input to a wired port of a main portal, i.e., the mesh portal 104 of FIG. 3, via a relay portal, i.e., the mesh portal 103 of FIG. 3, the mesh portal 104 compares information regarding MNs registered with the mesh portal 104, thereby preventing the broadcast packet from being forwarded back to the wireless network.

Figure 4:
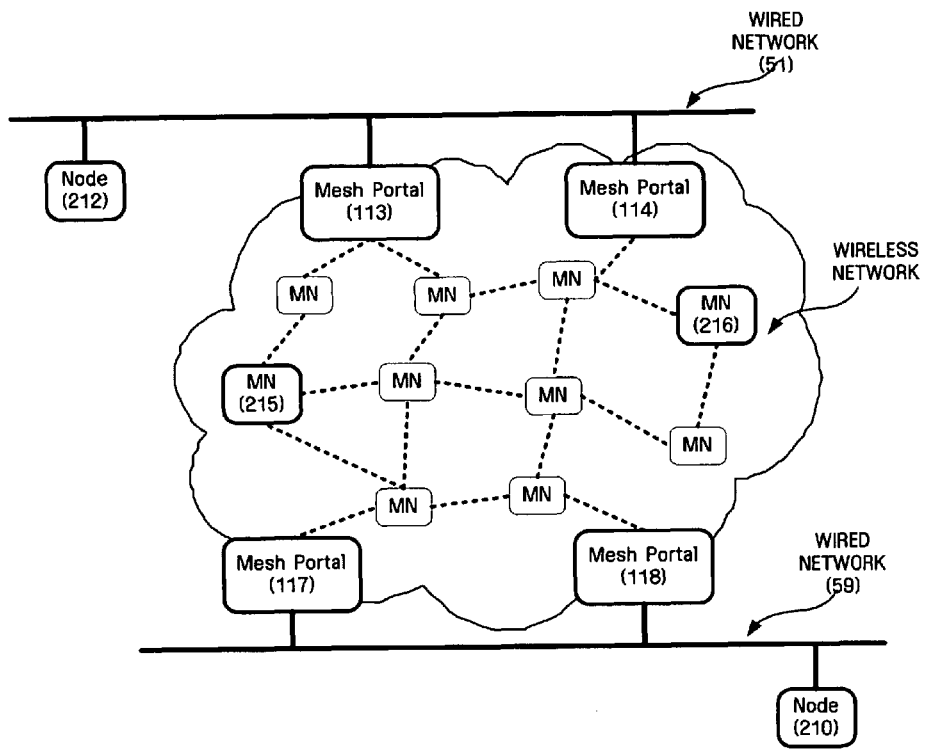
FIG. 4 is a diagram illustrating a network topology in which two separate wired networks are coupled to each other by a wireless network, according to an exemplary embodiment of the present invention.

FIG. 4 is a diagram illustrating a network topology in which two separate wired networks are coupled to each other by a wireless network, according to an exemplary embodiment of the present invention.

Wired networks 51 and 59 are not connected to each other by wires. If only the wired network 51 is connected to the Internet, the wired network 59 can be connected to the Internet through only the wired network 51. Therefore, a wired wireless network is needed to connect the wired networks 51 and 59.

As described above, one of a plurality of mesh portals connected to both a wired network and a wireless network is chosen as a main portal. Mesh portals 113 and 114 are connected to both the wired network 51 and the wireless network, and mesh portals 117 and 118 are connected to both the wired network 59 and the wireless network. Therefore, a total of 2 of the mesh portals 113, 114, 117, and 118 are chosen as main portals.

An MN chooses one of the plurality of mesh portals connected to the wired network as a relay portal to transmit a packet to the wired network. For example, an MN chooses one of the mesh portals 113 and 114, which are connected to the wired network 51, and one of the mesh portals 117 and 118, which are connected to the wired network 59, as relay portals.

The transmission of a unicast packet in the network environment illustrated in FIG. 4 will now be described in detail. The transmission of a unicast packet within a wireless network is conducted in the same manner as described above with reference to FIG. 3, and a detailed description thereof will be skipped.

The processes of transmitting a packet from a wireless network to a wired network in a network environment illustrated in FIG. 4 are the same as those described above with reference to FIG. 3 except that an MN chooses a relay portal for each of a plurality of wired networks and transmits a packet to all the relay portals. Thereafter, once a destination MN recognizes that packets are transmitted via a particular relay portal, the destination MN transmits the packets only to the relay portal. This is achieved by enabling all the portals to exchange information regarding MNs which choose the portals or information regarding MNs which are accessible through the portals. In other words, the portals store information regarding MNs which are reachable through the portals and provide the information to other portals so that the other portals can refer to the information when forwarding packets. In addition, portals provide MNs in a wireless network with information regarding MNs which are reachable through the portals, thereby making the MNs in the wireless network transmit packets to a proper relay portal while preventing the packets from being forwarded using an improper relay portal.

For example, in a case where an MN 215 in the wireless network wishes to transmit a packet to an MN 212 outside the wireless network, the MN 215 chooses one of the mesh portals 113 and 114, which are connected to the wired network 51 and share the wireless network, as a first relay portal of the MN 215 and chooses one of the mesh portals 117 and 118, which are connected to the wired network 59 and share the wireless network, as a second relay portal of the MN 215. If the MN 215 chooses the mesh portals 113 and 118 as the first and second relay portals, respectively, of the MN 215, the MN 215 transmits a packet to the mesh portals 113 and 118. Once the MN 215 recognizes that the MN 212 receives data via the mesh portal 113, the MN 215 begins to transmit packets to the MN 212 only via the mesh portal 113.

The transmission of a packet from a wired network to a wireless network is transmitted in a similar manner as described above with reference to FIG. 3.

The transmission of a packet from a wired network to another wired network in the network environment illustrated in FIG. 4, e.g., the transmission of a packet to a destination MN, i.e., to a node 210, from the MN 212, will now be described in detail. In this case, a main portal receives a packet from a wired network, determines whether a destination MN for which the packet is destined exists in a wireless network, and transmits the packet to a main portal of another wired network. For example, as illustrated in FIG. 4, a main portal, i.e., one of the mesh portals 113 and 114, connected to the wired network 51 transmits a packet transmitted by the MN 212 to a main portal, i.e., one of the mesh portals 117 and 118, connected to the wired network 59.

The transmission of a broadcast packet in the method illustrated in FIG. 4 will now be described in detail. When a broadcast occurs inside a wireless network, a broadcast packet is transmitted in the same manner as described above with reference to FIG. 3 except that, in the network environment illustrated in FIG. 4, an MN designates a relay portal for each of a plurality of wired networks and transmits a broadcast packet to each of the relay portals so that the relay portals can forward the broadcast packet to the respective wired networks.

When a broadcast occurs inside a wired network, a broadcast packet is transmitted in the same manner as described above with reference to FIG. 3. A broadcast packet wirelessly transmitted by a main portal is continuously transmitted by a main portal in a wired network.

Figure 5:
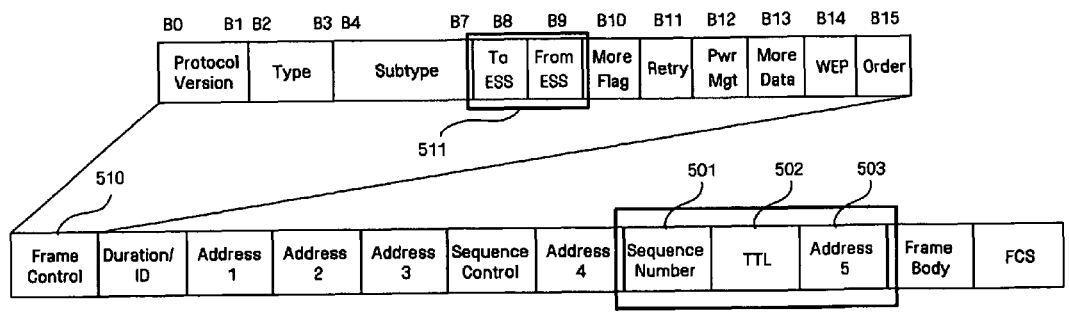
FIG. 5 is a diagram illustrating the format of a frame according to an exemplary embodiment of the present invention.

FIG. 5 is a diagram illustrating the format of a frame according to an exemplary embodiment of the present invention. As described above, according to the 802.11 address system, since a prioritized transmission of a packet is not possible using a certain portal, it is necessary to designate an additional address field.

Therefore, according to the current exemplary embodiment of the present invention, an additional address field 503, i.e., Address 5, is used to designate a portal to which packets must be transmitted with priority. In other words, for prioritized transmission of a packet to a relay portal, the address of the relay portal must be included in the additional address field (Address 5) which is added for transmitting the packet to the relay portal, and the packet must be transmitted first to the relay portal at the address included in the additional address field (Address 5). Then, the relay portal transmits the packet to a destination MN. The additional address field (Address 5) may be used not only for determining to which of a plurality of portals unicast packets must be transmitted first, but also for determining which of the plurality of portals is to forward broadcast packets from a wireless network to a wired network.

Referring to FIG. 5, a sequence number field 501 is used for preventing duplicate packets from being received, and a time-to-live (TTL) field 502 is used for limiting the number of hops via which packets are transmitted. A sequence number is a value added whenever a packet is generated and does not change while the packet is transmitted. An MN increases a sequence number by 1 whenever it generates a packet. When receiving a plurality of packets having the same sequence number, an MN which is supposed to forward the plurality of packets determines that the packets are duplicate packets and thus abandons the packets. The TTL field 502 is used for allowing a packet to be transmitted through only a limited number of MNs. An MN reduces a TTL field value by 1 whenever it forwards a packet. When the TTL field value reaches 0, an MN abandons the corresponding packet.

In a case where a portal is not a destination MN but exists along a path to the destination MN, it is possible to enable a packet to be transmitted first to the portal by using an encapsulation method instead of using the aforementioned additional address field-based method. In the encapsulation method, an 802.11 header is additionally attached to a MAC protocol data unit (MPDU). The address of a portal to which a packet must be transmitted first is set as a destination address of the 802.11 header so that the packet can be transmitted first to the portal. Then, the portal removes the 802.11 header from the packet and transmits the resulting packet to the destination MN.

Meanwhile, information about BSS can be used as ESSs (extended service sets). Referring to FIG. 5, a field <To BSS, From BSS> of a frame control field 510 according to an 802.11 header can be converted into a field <To ESS, From ESS> (511).

If the field <To ESS, From ESS> has a value of <0, 1>, a packet is transmitted from a wireless network to a wired network. If the field <To ESS, From ESS> has a value of <1, 0>, the packet is transmitted from a wired network to a wireless network. If the field <To ESS, From ESS> has a value of <0, 0>, the packet is transmitted within a wireless network.

Figure 6:
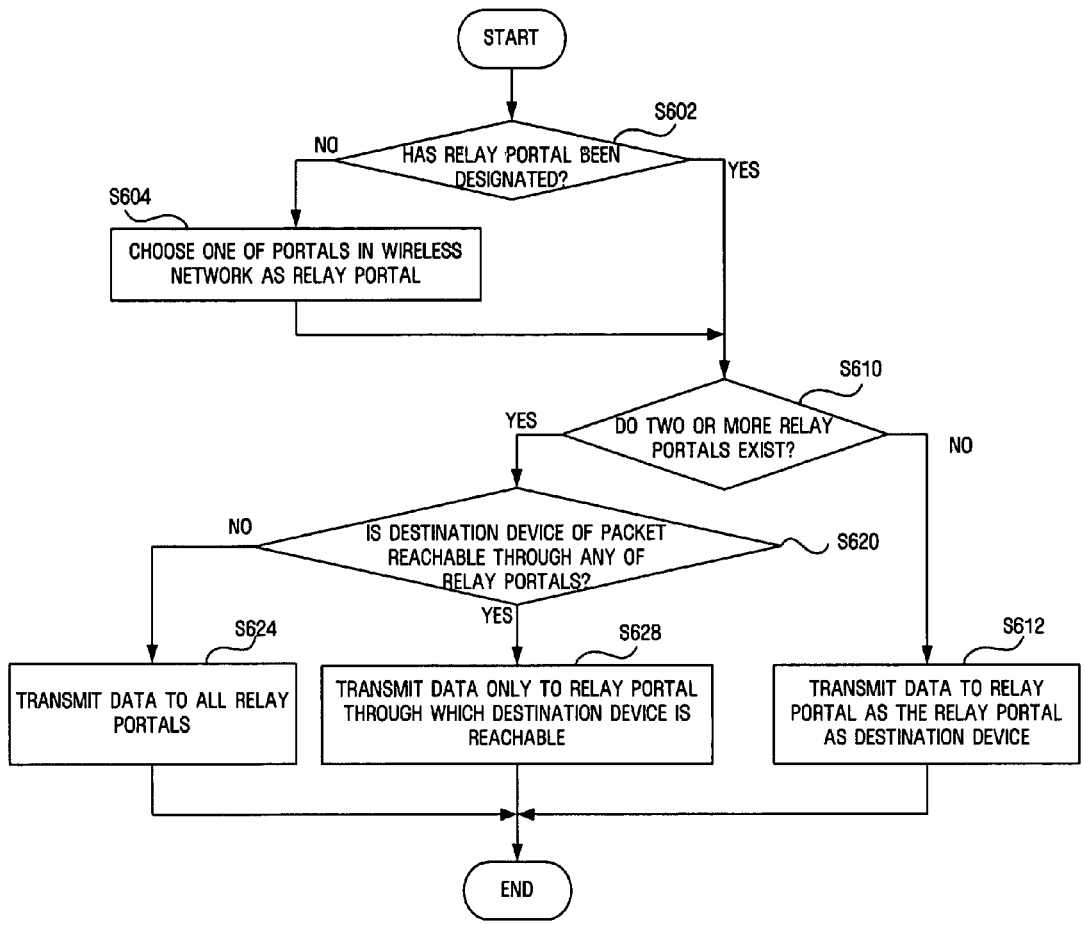
FIG. 6 is a flowchart illustrating the transmission of data by a mobile node according to an exemplary embodiment of the present invention.

FIG. 6 is a flowchart illustrating the transmission of data by a mobile node according to an exemplary embodiment of the present invention.

When transmitting data, an MN needs to specify a destination device to which the MN wishes to transmit the data. If the destination device exists outside a wireless network, the MN must designate a relay portal to relay the data to the destination device. Therefore, referring to the method illustrated in FIG. 6, in operation S602, it is determined whether the MN has chosen or designated a relay portal. In operation S604, if the MN has not yet chosen or designated a relay portal, the MN chooses one of a plurality of portals in the wireless network as a relay portal. In detail, the MN chooses one of the portals which share the same wired network and the same wireless network and are connected to both the wired network and the wireless network as a relay portal. In the network environment illustrated in FIG. 4, two separate wired networks are connected to a wireless network, and thus, a total of 2 relay portals can be designated. In operation S610, it is determined whether the MN has designated two or more relay portals. In operation S620, if two or more relay portals are designated, it is determined whether a destination MN 212 can be reached through any of the relay portals. Referring to FIG. 4, since the MN 212 is connected to the upper wired network 51, it can be reached through the mesh portals 113 and 114, and thus, packets destined for the MN 212 are transmitted to the mesh portals 113 and 114. Likewise, if the destination MN is determined in operation S620 to be reachable through any of the relay portals, data is transmitted to the relay portal through which the destination MN is reachable in operation S628. Also, if there is no information about determination in operation S624, data is transmitted to all relay portals. If the MN has designated only one relay portal, data is transmitted to the relay portal in operation S612.

Figure 7:
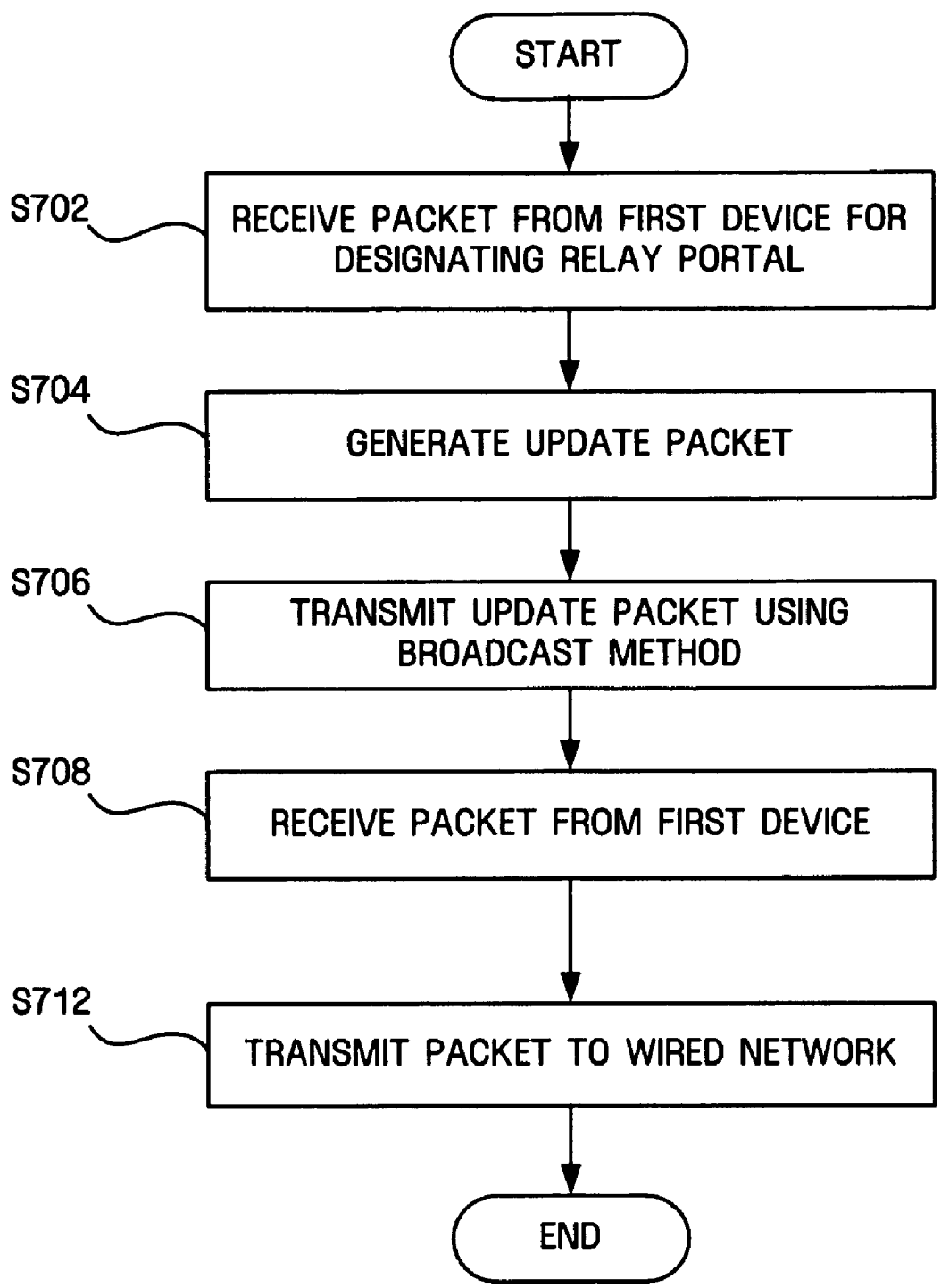
FIG. 7 is a flowchart illustrating the transmission and reception of data using a mesh portal according to an exemplary embodiment of the present invention.

FIG. 7 is a flowchart illustrating the transmission and reception of data using a mesh portal according to an exemplary embodiment of the present invention.

Referring to the method illustrated in FIG. 7, a first device transmits a packet to designate a predetermined portal as a relay portal. In operation S702, the predetermined portal receives from the first device the packet which indicates that the predetermined portal has been designated as a relay portal. In operation S704, the predetermined portal generates an update packet in which an identifier of the first device, for example, a MAC address of the first device, is set as a source address. In operation S706, the predetermined portal transmits the update packet to a wired network using a broadcast method. As a result, portals or bridges connected to the wired network register a device corresponding to the MAC address included in the update packet, i.e., the first device, with a filtering database. In operation S708, the predetermined portal receives a packet transmitted by the first device. In operation S712, the predetermined portal transmits the packet to the wired network.

According to an exemplary embodiment of the present invention, it is possible to prevent a loop from being generated using relay portals and a main portal.

An exemplary embodiment of the present invention enables data to be transmitted to and received from a wired network using a relay portal.

It will be apparent to those skilled in the art that various modifications and changes may be made thereto without departing from the scope and spirit of the invention. Therefore, it should be understood that the above exemplary embodiments are not restrictive but illustrative in all aspects. The scope of the present invention is defined by the appended claims rather than the detailed description of the invention. All modifications and changes derived from the scope and spirit of the claims and equivalents thereof should be construed to be included in the scope of the present invention.

What is claimed is:

1. A method of transmitting and receiving data in a network environment with a wired network and a wireless network bridged using a relay portal, the method comprising:
registering a predetermined device with one of a plurality of portals, each sharing the wired network and the wireless network, as a main portal;
choosing at least one of the plurality of portals as the relay portal for the predetermined device; and
transmitting a data packet to the wired network via the relay portal as a prioritized receiver of the data packet, by setting an identifier of the relay portal;
wherein the choosing the at least one of the plurality of portals as the relay portal comprises broadcasting an update packet, from the relay portal, wherein the update packet has an address of the predetermined device as a source address.

2. The method of claim 1, further comprising adding to the data packet an identifier of a destination device which is to receive the data packet.

3. The method of claim 2, if two or more relay portals exist and a first relay portal can transmit data to the destination device, generating a data packet which sets the first relay portal as the prioritized receiver of the data packet.

4. The method of claim 1, wherein, if a destination device exists outside the wireless network, the data packet is transmitted through the relay portal to the wired network to which the relay portal is connected.

5. The method of claim 1, further comprising receiving from the wired network data transmitted to the wireless network, wherein the data is transmitted from the wired network to the wireless network through the relay portal.

6. The method of claim 1, wherein the data packet includes an identifier of a destination device as a primary destination address and includes the identifier of the relay portal as a secondary destination address.

7. The method of claim 1, wherein the wireless network is based on an IEEE 802.11 standard.

8. A method of transmitting and receiving data in a network environment with a wired network and a wireless network bridged using a relay portal, the method comprising:
- receiving, at the relay portal from a predetermined device, a first packet for designating a relay portal;
- generating, at the relay portal, an update packet having the address of the predetermined device as a source address;
- transmitting the update packet from the relay portal using a broadcast method; and
- receiving, at the relay portal, a second packet from the predetermined device and transmitting the second packet from the relay portal to the wired network if a destination device of the second packet does not exist in the wireless network.

9. The method of claim 8, further comprising the relay portal adding to the second packet an identifier of the destination device which is to receive the data packet and the identifier of the relay portal.

10. The method of claim 8, wherein the wireless network is based on an IEEE 802.11 standard.

11. A method of transmitting and receiving data of a wireless device connected to a wireless network, comprising:
- the wireless device receiving a data packet which indicates an existence of the wireless network;
- the wireless device analyzing the received data packet and connecting to the wireless network;
- registering identifying information of the wireless device at a main portal which is connected to the wireless network and a wired network; and
- the wireless device designating one of a plurality of portals, each connected to the wireless network and a wired network, as a relay portal;
- wherein the relay portal broadcasts an update packet having an address of the wireless device as a source address.

12. The method of claim 11, wherein the identifying information of the wireless device comprises a media access control (MAC) address of the wireless device.

13. The method of claim 11, wherein if the wireless device is an access point, said method further comprises registering identifying information of a secondary wireless device which exists in a basic service set (BSS) controlled by the access point, at the main portal.

* * * * *